May 13, 1969 H. SEIDEL 3,444,475

BROADBAND HYBRID-COUPLED CIRCUIT

Filed April 19, 1967 Sheet 1 of 3

INVENTOR
H. SEIDEL
BY
Sylvan Sherman
ATTORNEY

United States Patent Office 3,444,475

Patented May 13, 1969

3,444,475

BROADBAND HYBRID-COUPLED CIRCUIT

Harold Seidel, Warren Township, Somerset County, N.J., assignor to Bell Telephone Laboratories, Incorporated, Berkeley Heights, N.J., a corporation of New York Filed Apr. 19, 1967, Ser. No. 632,058
Int. Cl. H03f 3/60
U.S. Cl. 330—53 3 Claims

ABSTRACT OF THE DISCLOSURE

This application describes a broadband hybrid-coupled fan-out circuit wherein the broadbanding is obtained by the particular location of 180 degree phase shifters in the several branches of the fan-out. Specifically, for any pair of symmetrically-situated input and output hybrids, the electrcal lengths of the branches located along one of the two wavepaths connecting said pair of hybrids differ from the electrical lengths of the corresponding branches located along the other interconnecting wavepath by 180 degrees over the band of operating frequencies.

This invention relates to multibranched, hybrid-coupled circuits including amplifiers and oscillators.

*Background of the invention*

Until very recently, the utilization of many solid-state active circuit components, such as transistors and tunnel diodes, for example, has been limited to relatively low power applications. This was due to the lower power handling capability of such devices and their relatively high cost which discouraged their use in large numbers as a means of overcoming their limited power handling capacity. Recently, however, there has been a substantial reduction in the cost of many solid-state devices which, in turn, now makes it commercially feasible to use them in relatively large numbers.

The technical problems associated with operating large numbers of active elements in a parallel array are problems of synchronization and stabilization. Stating the problem briefly, the many independent active elements must be synchronized so as to cooperate in a manner to produce maximum output power for the desired mode of operation, while, at the same time, the active elements must be incapable of cooperating at all other possible modes of operation. The suppression of spurious modes must be insured both without the frequency range of interest as well as within the frequency range of interest, thus insuring unconditional stable operation.

In my copending application Ser. No. 507,011, filed Nov. 9, 1965, out-of-band as well as in-band stability is achieved by the use of quadrature hybrid junctions in a hybrid fan-out structure. To avoid narrowing of the overall, in-band frequency response as the number of stages is increased, a broadband 180 degree phase shift is introduced between hybrids in the manner disclosed by E. A. J. Marcatili and D. H. Ring in United States Patent 3,184,-691. However, to avoid the expense and counter the difficulties of providing a large number of broadband 180 degree phase shifters, a balanced fan-out is used in which one-half of the fan-out operates 180 degrees out of phase with the other half. In such a system, a 180 degree phase shift is obtained, wherever required, by the interconnection of symmetrical portions of the balanced system. Such and arrangement reduces to only two the number of instances in which a broadband 180 degree phase shift is required, i.e., one at the input end of the system, and the other at the output end.

*Summary of the invention*

The present invention avoids the need for a balanced fan-out structure, and for interconnection symmetrical portions of the balanced system. In accordance with the present invention, the desired bandwidth is obtained by the particular location of the 180 degree phase shifters in the several branches of the fan-out circuit. Specifically, for any pair of symmetrically-situated input and output hybrids, the electrical lengths of the branches located along one of the two wavepaths connecting said pair of hybrids differ from the electrical lengths of the corresponding branches located along the other interconnecting wavepath between said hybrids by 180 degrees over the band of operating frequencies.

It is a feature of the invention that no signal component passes through more than one 180 degree phase shifter, thereby avoiding the introduction of cumulative errors caused by imperfections in the phase shifters.

These and other objects and advantages, the nature of the present invention, and its various features, will appear more fully upon consideraton of the various illustrative embodiments now to be described in detail in connection with the accompanying drawings.

*Detailed description*

Figure 1:
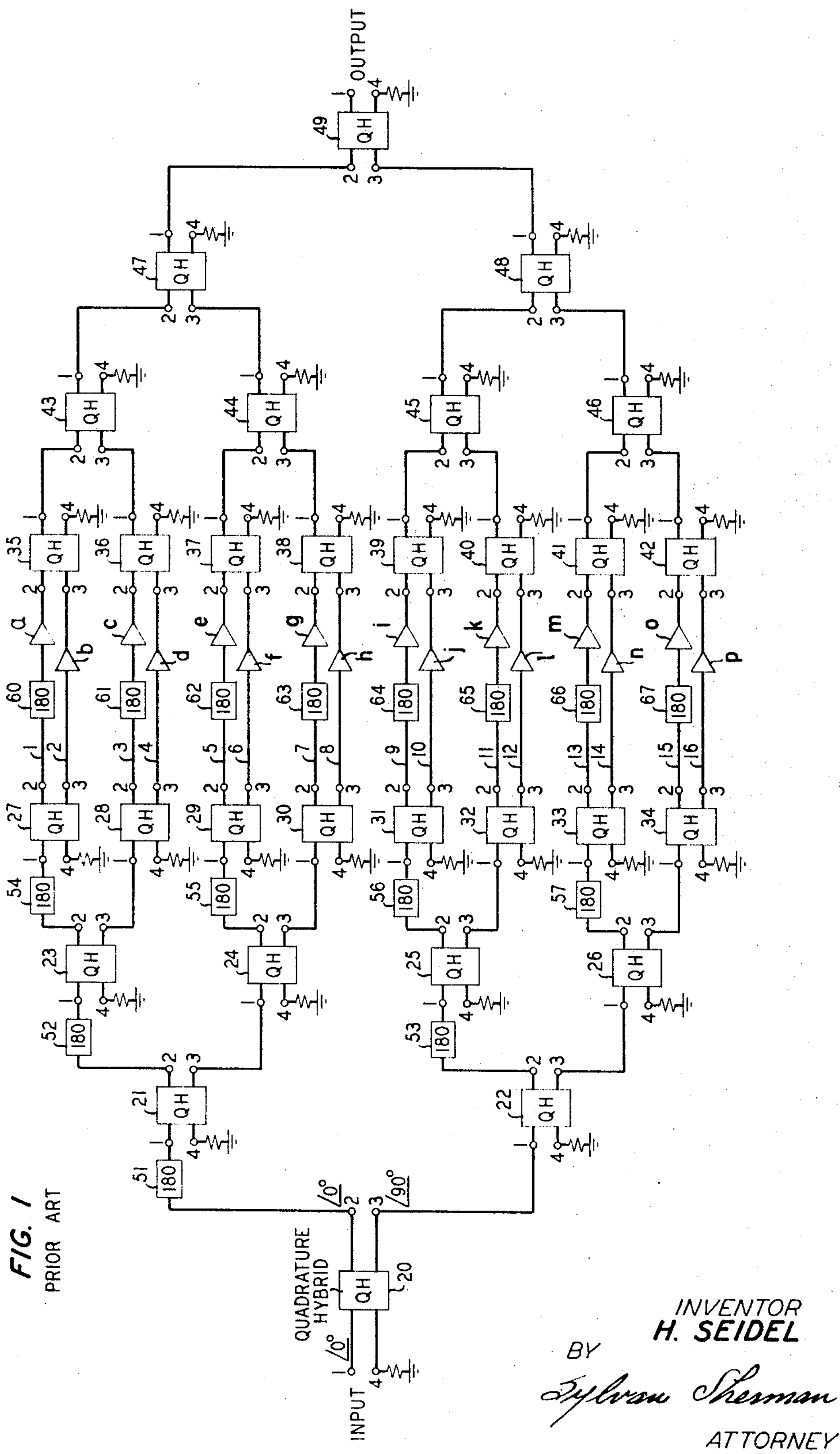
FIG. 1 PRIOR ART
FIG. 1 shows a hybrid fan-out circuit in accordance with the prior art.

Referring to the drawings, FIG. 1 shows a 16-branch quadrature hybrid fan-out circuit, broadbanded in the manner described in my above-cited copending application. The input end of the fan-out comprises fifteen, substantially identical, 3 db quadrature hybrids 20 to 34, arranged to successively divide the input signal into sixteen equal components.

The term "hybrid junction" is used here in its accepted sense to describe a power dividing network having four ports in which the ports are arranged in pairs, with the ports comprising each pair being conjugate to each other, but in coupling relationship to the ports of the other of said pairs. In addition, in the "quadrature" hybrid junction there is a 90 degree relative phase shift between the two divided signal components. This is indicated for hybrid 20 by the $\angle 0°$ and $\angle 90°$ indications at output ports 2 and 3.

Generally, hybrid junctions can be designed to have any arbitrary power-division ratio. In the special case of a unity power-division ratio, the two output signal components are equal, and the hybrid is referred to as a "3 db" hybrid. However, it is recognized that the power-division ratio varies as a function of frequency and that it is substantially constant over a limited band.

To avoid unnecessary repetition, the term "hybrid junction" or simply "hybrid," as used herein, shall be understood to refer to a 3 db quadrature hybrid junction. Typical of such devices are the Riblet coupler (H. J. Riblet, "The Short-Slot Hybrid Junction," Proceedings of the Institute of Radio Engineers, vol. 40, No. 2, February 1952, pages 180 to 184), the multihole directional coupler (S. E. Miller, "Coupled Wave Theory and Waveguide Applications," Bell System Technical Journal, vol. 33, May 1954, pages 661 to 719) and the semioptical directional coupler (E. A. J. Marcatili, "A Circular Electric Hybrid Junction and Some Channel-Dropping Filters," Bell System Technical Journal, vol. 40, January 1961, pages 185 to 196).

Briefly, the operation of the fan-out circuit shown in FIG. 1 is as follows. An input signal applied to port 1 of hybrid 20 is divided substantially equally between conjugate ports 2 and 3 with a degree of frequency sensitivity which varies over the frequency band of interest. Port 4 is match terminated by suitable means 50. Port 2 of hybrid 20 is connected through a 180 degree phase shifter 51 to port 1 of hybrid 21 wherein the signal component derived from port 2 of hybrid 20 is again divided into two equal signal components in conjugate ports 2 and 3 of hybrid 21. Similarly, port 3 of hybrid 20 is connected to port 1 of hybrid 22, wherein the signal component derived from port 3 of hybrid 20 is likewise divided into two equal signal components in conjugate ports 2 and 3 of hybrid 22.

This process of division and subdivision continues in each of the successive hybrid stages until the original signal has been divided into sixteen equal components. These signal components are typically amplified, or otherwise operated upon, by suitable means *a* through *p* located along each of the sixteen branches 1 to 16 of the fan-out circuit. The modified signal components are then coupled to a symmetrical set of hybrids 35 to 49 on the output end of the fan-out, wherein the sixteen signal components are recombined to produce a single, output signal in port 1 of hybrid 49.

As indicated above, broadbanding is produced by the introduction of a 180 degree phase shift in one of the two wavepaths interconnecting symmetrically-situated hybrids. Thus, for example, branch 1, between symmetrically-situated hybrids 27 and 35 includes a 180 degree phase shifter 60, as does one of the wavepaths between each of the symmetrically-situated pairs of hybrids 28–36, 29–37, 30–38, 31–39, 32–40, 33–41 and 34–42. Similarly, one of the wavepaths between each of the symmetrically-situated pairs of hybrids 23–43, 24–34, 25–45, 26–46, 21–47, 22–48 and 20–49 also includes one of the 180 degree phase shifters 51 through 57. In general, a fan-out having $2^n$ branches, comprises 2 $(2^n-1)$ hybrids, and $(2^n-1)$ phase shifters, where *n* is a positive integer.

From an examination of the various possible signal paths between the input terminal of the fan-out and the output terminal, it is noted that the various signal components can traverse either four, three, two, one or none of the phase shifters. This means that each of the phase shifters must be of a sufficiently high quality such that the cumulative error introduced is negligible over the frequency band of interest, even when a signal component traverses up to as many as four phase shifters.

This requirement upon the quality of the phase shifters would be significantly reduced if the circuit could be modified such that none of the signal components, in traversing the fan-out, had to pass through more than one phase shifter. If this could be arranged, cumulative errors would be avoided, and the level of performance of the phase shifters could be correspondingly relaxed.

Figure 2:
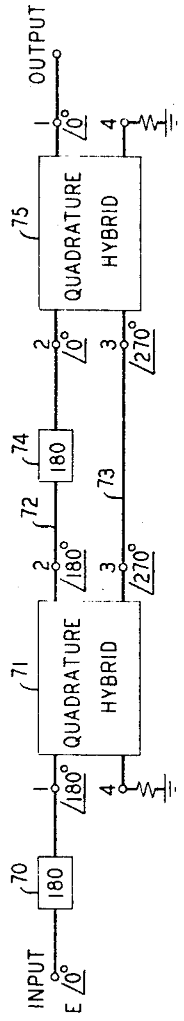
FIG. 2 shows the relative phase of a signal at various locations in a portion of the circuit of FIG. 1.
Figure 3:
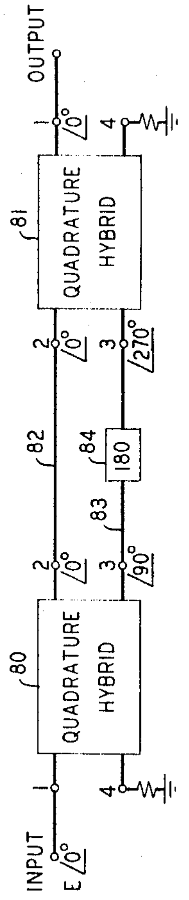
FIG. 3 shows a modification of the circuit portion shown in FIG. 2.

The present invention, which achieves this result, is based upon the realization that the circuit illustrated in FIG. 2, which employs two hybrids 71 and 75 and a phase shifter 70 in series with port 1 of hybrid 71, and a phase shifter 74 between ports 2 of the hybrids (corresponding to that portion of the fan-out circuit between port 2 of hybrid 23 and port 1 of hybrid 43 in FIG. 1) is the equivalent of the circuit illustrated in FIG. 3, which employs only one phase shifter 84.

Designating the input signal $E\angle 0$, the relative phases of the signal components at various locations between the input and output ports are shown in FIG. 2. In particular, the phase of the signal at output port 2 of hybrid 75 is $\angle 0°$.

By a similar process, it is readily seen that the circuit of FIG. 3, which comprises a first hybrid 80, a second hybrid 81, two interconnecting branches 82 and 83, but only one phase shifter 84 located in the lower branch 83 between ports 3 of the hybrids, is in all relevant respects the equivalent of the circuit shown in FIG. 2. That is, an input signal $E<0$ results in an output signal in port 2 of hybrid 81 that has the same relative phase $\angle 0°$ as the output signal in the circuit of FIG. 2. Thus, the circuit of FIG. 1 can be modified, and some of the phase shifters eliminated, by the proper location of the phase shifters in eight of the branches 1 to 16.

Figure 4:
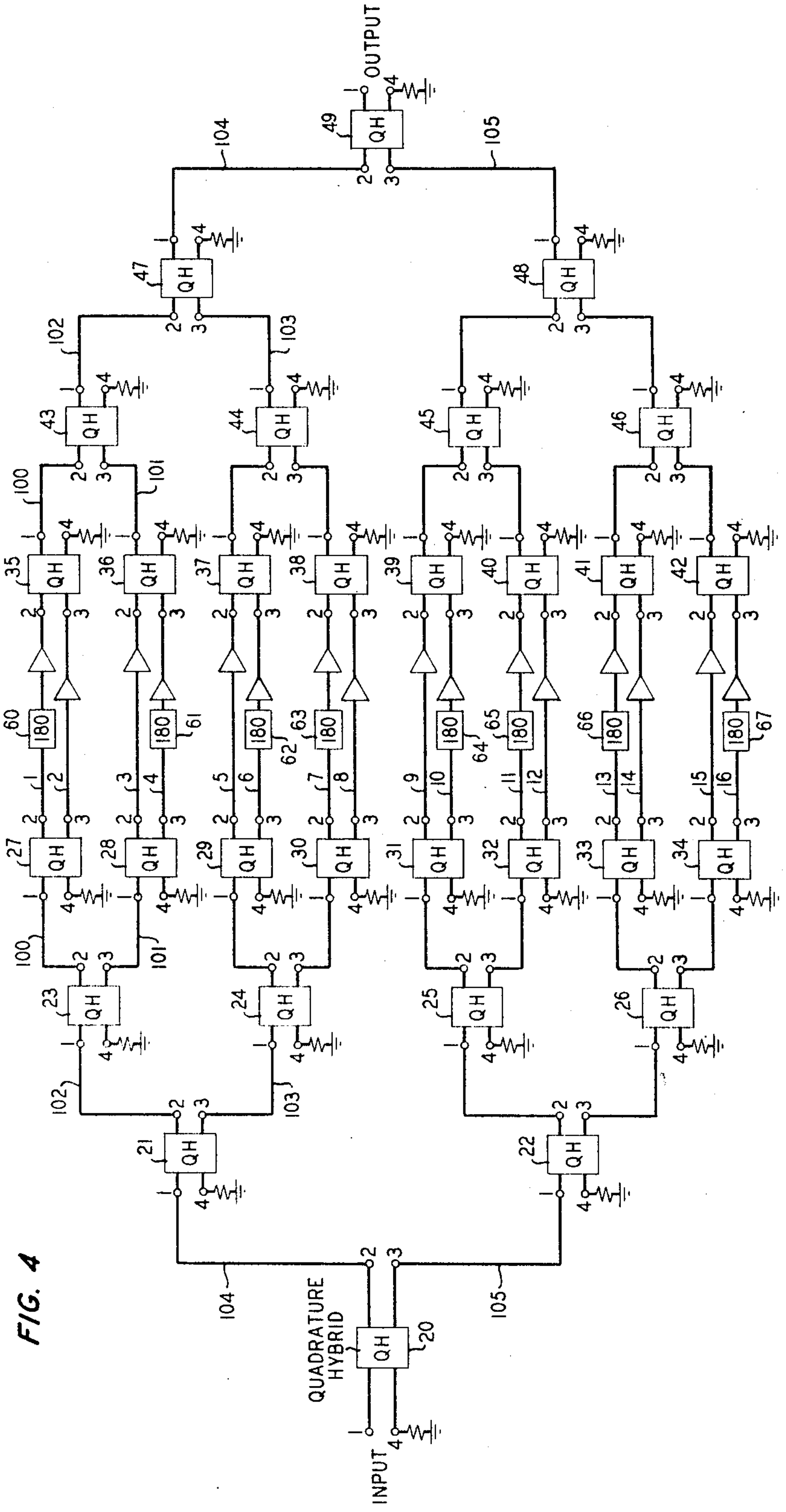
FIG. 4 shows a hybrid fan-out circuit in accordance with the invention.

FIG. 4 shows a sixteen branch, hybrid-coupled fan-out circuit, incorporating the features exemplified by the circuit of FIG. 3. For purposes of comparison, the same identification numerals have been retained as in FIG. 1. Thus, the input hybrids, as before, are numbered 20 through 34, and the output hybrids are numbered 35 through 49. However, phase shifters 51 through 57 are eliminated, and phase shifters 60 through 67 have been rearranged. The manner of rearrangement is as follows. With respect to any pair of symmetrically-situated hybrids, the electrical length of the branches located along one of the two wavepaths connecting conjugate pairs of ports of the two hybrids differ by 180 degrees from the lengths of the corresponding branches located along the other interconnecting wavepath between the two hybrids.

Referring to FIG. 4, let us first consider the pair of symmetrically-situated hybrids 27 and 35. In this simple case there is only one branch, 1 or 2, included in each of the two interconnecting wavepaths. By locating a phase shifter 60 in one of the branches, 1, the electrical lengths of the two branches differ by 180 degrees, as required.

Next, let us consider the two symmetrically-situated hybrids 23 and 43. One of the interconnecting wavepaths 100 includes the two branches 1 and 2, while the other wavepath 101 includes branches 3 and 4. Of these, the electrical lengths of corresponding branches 1 and 3, and 2 and 4, in the two respective interconnecting wavepaths, differ by 180 degrees due to the presence of phase shifter 60 in branch 1, and phase shifter 61 in branch 4. shifter 61 in branch 4.

Similarly, a comparison of the electrical lengths of branches 1, 2, 3 and 4 in one of the wavepaths 102 connecting symmetrically-situated hybrids 21 and 47, and the corresponding branches 5, 6, 7 and 8, in the other wavepath 103, connecting hybrids 21 and 47, reveals that there is a 180 degree difference between the electrical lengths of the branches of each of the pairs of corresponding branches 1–5, 2–6, 3–7 and 4–8. A similar comparison can also be made between corresponding branches 1–9, 2–10, 3–11, 4–12, 5–13, 6–14, 7–15 and 8–16, in the two wavepaths 104 and 105 interconnecting hybrids 20 and 49.

In the discussion above, "corresponding" branches of the two interconnecting wavepaths were referred to. It would appear desirable, at this point, to examine this reference in greater detail.

In the simple situation where each of the two wavepaths connecting the two symmetrically-situated hybrids contains only one branch, as is the case, for example, between hybrids 27 and 35, the corresponding branches are simply the two branches 1 and 2. Where there are additional branches, as when hybrids 23 and 43 are considered, corresponding branches are identified by tracing identical paths to the several branches from each of the ports 2 and 3, respectively, of hybrid 23. Assuming that all number 2 ports are the $\angle 0°$ ports in each hybrid, and all number 3 ports are the $\angle 90°$ ports, corresponding branches are identified by starting at port 2 of hybrid 23 and tracing a path, for example, to port 2 of hybrid 27, and by starting at port 3 of hybrid 23 and tracing a path to port 2 of hybrid 28. The branches 1 and 3 connected to these two number 2 ports are corresponding branches. Similarly, branches 2 and 4, connected to the number 3 ports of hybrids 27 and 28, respectively, are corresponding branches.

The same method is employed when additional branches are involved, as when hybrids 21 and 47 are considered. For example, starting at port 2 of hybrid 21, a path can be traced through the number 2 ports of each of the intervening hybrids 23 and 27 to branch 1. Similarly, starting at port 3 of hybrid 21, a path can be traced through the number 2 ports of each of the hybrids 24 and 29 to branch 5. Accordingly, branches 1 and 5 are corresponding pairs. Alternatively, one can go from port 2 of hybrid 21, to port 3 of hybrid 23, to port 2 of hybrid 28 and branch 3. A similar path through hybrids 24 and 30 would reach branch 7. Thus branches 3 and 7 are corresponding pairs.

Figure 5:
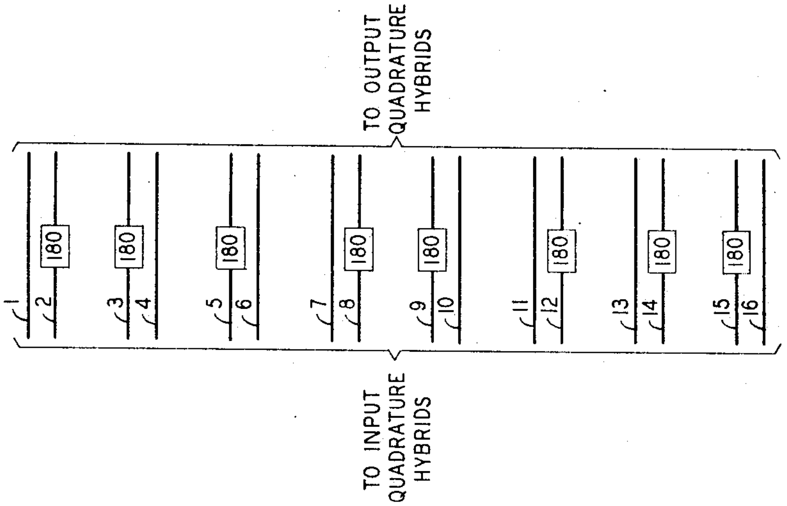
FIG. 5 shows an alternative arrangement of the 180 degree phase shifters in accordance with the invention.

In the embodiment of FIG. 4, the first phase shifter 60 was arbitrarily located in branch 1. It is equally apparent that phase shifter 60 could just as readily have been placed in branch 2. If this was done, the arrangement of phase shifters in the sixteen branches would be as illustrated in FIG. 5. In all respects, a circuit arranged as illustrated in FIG. 5 would have the same overall characteristics as that illustrated in FIG. 4.

One of the advantages of a fan-out circuit, in accordance with the invention, is that the required phase shift can be conveniently obtained in the amplifier itself. For example, when transformer-coupled amplifiers are used, a 180° phase shift is conveniently obtained by the simple expedient of reversing the transformer connections. Since broadband transformers are readily available, (see, for example, U.S. Patent 3,037,175, issued to C. L. Ruthroff) it is a correspondingly simple matter to obtain broadband 180 degree phase shift.

As indicated above, the fan-out circuit described herein can be used as an amplifier by the inclusion of an amplifier stage in each of the branches. As was also noted in my above-cited copending application, the fan-out circuit can be used as a high power oscillator by the inclusion of a suitable feedback path between the output and input terminals, as is well known in the art.

While a 16 branch fan-out has been described hereinabove, for purposes of illustration, it is obvious that by the inclusion of additional hybrids, the number of branches can be increased. In general, the use of $2(2^n-1)$ hybrids provides $2^n$ branches, where $n$ is any positive integer. Thus, in all cases, it is understood that the above-described arrangements are illustrative of but a small number of the many possible embodiments of the invention. Numerous and varied other arrangements can readily be devised in accordance with these principles, by those skilled in the art, without departing from the spirit and scope of the invention.

I claim:

1. A multibranched circuit comprising:

a plurality of $2(2^n-1)$ 3 db quadrature hybrid junctions connected in a fan-out arrangement to provide $2^n$ branches, where $n$ is a positive integer greater than one;

said hybrids arranged with respect to said $2^n$ branches such that each hybrid on the input end of said fan-out is connected by means of a pair of wavepaths to a symmetrically located hybrid in the output end of said fan-out;

characterized in that the attenuation in all of said branches is the same;

and in that the electrical length of each branch located along any one wavepath, between pairs of symmetrically located hybrids, differs by a constant 180 degrees from the length of the corresponding branch located along the other of said pair of wavepaths.

2. The circuit according to claim 1 wherein identical means are included in each branch for operating upon the signal in each of said branches.

3. The circuit according to claim 1 wherein an amplifier is included in each of said branches.

References Cited

UNITED STATES PATENTS 3,323,080 5/1967 Schwelb et al. -------- 333—11

ROY LAKE, *Primary Examiner.*

J. B. MULLINS, *Assistant Examiner.*

U.S. Cl. X.R.

330—124; 333—11